350-376 SR

XR 3,787,825

United States Patent [19]

De Jonge

[11] 3,787,825

[45] Jan. 22, 1974

[54] MAGNETIC DOMAIN STORE

[75] Inventor: Frederik Ate De Jonge, Eindhoven, Netherlands

[73] Assignee: U.S. Philips Corporation, New York, N.Y.

[22] Filed: Nov. 6, 1972

[21] Appl. No.: 303,980

[30] Foreign Application Priority Data

Nov. 12, 1971 Netherlands ........................ 7115628

[52] U.S. Cl. ...... 340/174 YC, 340/174 TF, 350/151

[51] Int. Cl. ......................... G11c 11/14, G11c 11/42

[58] Field of Search .............340/174 YC, 174 TF; 346/74 MT; 350/151

[56] References Cited

UNITED STATES PATENTS

| | | | |
|---|---|---|---|
| 3,150,356 | 9/1964 | Newman | 340/174 YC |
| 3,503,054 | 3/1970 | Bobeck et al. | 340/174 YC |
| 3,729,724 | 4/1973 | Ahearn et al. | 340/174 TF |
| 3,696,346 | 10/1972 | Zook | 340/174 YC |
| 3,453,646 | 7/1969 | Speliotis et al. | 346/74 MT |

OTHER PUBLICATIONS

IBM Technical Disclosure Bulletin, "Magnetic Bubble Domain Display Device" by Chang et al., Vol. 13, No. 5, 10/70, pp. 1187, 1188.

RCA Technical Notes, "Bubble Domain Constructions" by Kurlansik et al. TN No. 885; 6/4/71; 3 Sheets.

IBM Technical Disclosure Bulletin, "Thermal Manipulation of Bubble Domains" by Gambino et al., Vol. 13, No. 7; 12/70; pp. 1788–1790.

*Primary Examiner*—Stanley M. Urynowicz, Jr.
*Attorney, Agent, or Firm*—Frank R. Trifari

[57] ABSTRACT

A magnetic store comprising a plate of magnetic material which has a compensation temperature for magnetization, and in which domains are situated in one of two possible positions of functionally determined bit locations. The displacement of a domain from a first position to a second position, or vice versa, is effected under the influence of a thermal-energy carrying beam, which can be positioned on at least one of the bit locations at a time. When the bit locations are heated, the section of a domain becomes strip-like. During cooling a magnetic field is applied which has a direction such that the relevant domain, assuming its original shape again, will be situated in the desired position of the two possible positions. Detection of the information contents is effected by means of light, which is transmitted through a mask which covers half the area of each bit location. The first and second domain positions are defined by elements of a readily magnetizable material or by an additional plate which is filled with domains.

7 Claims, 8 Drawing Figures

MAGNETIC DOMAIN STORE

Figure 1:
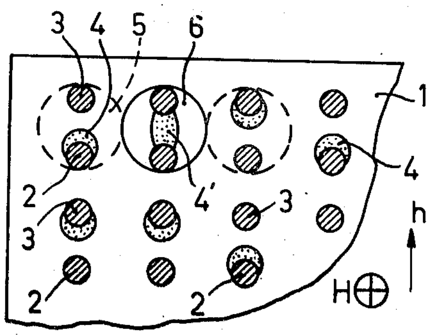

The invention relates to a magnetic store comprising a plate of magnetic material on which functionally determined bit locations are provided. Each bit location has a first and a second position. Each said bit location has one domain which has a mainly circular section, and transport means for controlled displacement of the domain from a first to a second position or vice versa for a chosen bit location. Detection means provided for detecting the presence of a domain in one of the two positions of a bit location. The plate of magnetic material furthermore having a compensation temperature for the magnetization and being surrounded by means for keeping the plate at a substantially constant temperature. A radiation source and a beam deflection and addressing system are also provided.

A magnetic store of this kind is known in which, the transport means are formed by groups of conductors which are arranged on or near the plate of magnetic material and by means of which, using current pulses, the desired displacement of domains from a first to a second position of a bit location is effected. A pattern of domains which are present in a first or a second position of each bit location has an information content, so that the said plate serves as an information storage plate or store.

In this known store, domains are generated in a position of the bit locations by means of the beam originating from the radiation source (and positioned in such a position by means of the deflection and addressing system), the said domains being subsequently controlled by means of said transport means.

The storage capacity, i.e., the number of bit locations per unit of surface area, of such a plate of magnetic material is dependent on a plurality of factors. Some of these factors are: the thickness of the plate and the value of an applied basic magnetic field. However, there are a number of important restrictive factors by which the storage capacity is limited in practice: a plate of magnetic material having $m \times n$ bit locations requires $m + n$ conductors, all of which have to be accessible from the outside. This imposes problems, because of the lack of space for connecting the connectors (compare similar problems with integrated circuits). Furthermore, comparatively large fields and hence large currents are required in said conductors for displacement of a domain from a first position to a second position. So as to prevent overheating, these currents are limited again, with the result that the displacement rate is limited. Moreover, the displacement rate is also limited by the inductance produced on the plate by the conductors. Because the conductors must be very accurately positioned with respect to each other, very severe structural requirements are imposed as regards the provision of these conductors on the magnetic plate.

The invention has for its object to provide means enabling a substantial increase of the storage capacity of a magnetic plate in which domains are situated, which domains contain information by their presence in one of two possible positions of a bit location. The abovementioned limitations imposed by connections, large fields, inductance and construction also are eliminated. In order to achieve this object, the magnetic store according to the invention has a radiation source which can supply a thermal-energy carrying beam which can be positioned on at least one bit location at a time, and by means of which a quantity of heat can be applied to the bit location in a temperature range above the compensation temperature. The heat causing the domain to change from a mainly circular section to a mainly striplike section, there further being provided a magnetic field source supplying a magnetic field for situating a domain during the cooling, in one of the two positions of the bit location thus heated. The relevant domain is then changed over again from a mainly strip-like section to a mainly circular section.

It is known from a previous publication ("I.B.M. Technical Disclosure Bulletin," December 1970, pages 1788–1790), that a domain in a plate of magnetic material which has a compensation temperature for the magnetization can be displaced by utilizing the thermal effect of a beam. However, an important difference exists between this known displacement using the thermal effect, and the displacement of a domain in the device according to the invention. In the known case, a location is heated to which a domain is to be displaced. The temperature of the initial location of the domain is not increased. Consequently, the displacement of the domain is effected by attraction which originates from the area in the magnetic plate which is heated. This attraction is due to the fact that the magnetization $M_s$ at the area of the heated location increases, and hence domains in its vicinity are drawn thereto as if they were. The described set-up has various objections and drawbacks. First of all, a bit location where a domain is present in one of two positions must be situated at an adequate distance from other bit locations and their domains, so as to prevent domains of those other bit locations from being attracted to the heated location.

This means that there is a capacity limitation for the information storage in such a plate. Furthermore, the first and the second position of a bit location must be near enough to each other, so as to avoid having to apply a comparatively large quantity of heat to a second position to ensure that a domain is displaced from the first position to the second position. This is necessary to prevent heat distribution over the plate and, moreover, to ensure that such a domain displacement is not too slow. However, if the first and second position are situated very close to each other, this means in the known case, that the beam providing the heating must be sharply defined, notably as regards to target area of the beam on the plate of magnetic material. This means that severe requirements are imposed as regards the radiation source and the deflection system. In the device according to the invention, these aspects are different and less complex. The entire bit location is heated, i.e., both the first and the second position for a domain in this bit location. This means a less severe requirement as regards the thermal beam definition in the target area. The domain at the area of a bit location, notably in the first position, is blown up as it if were from the inside when heated, and its section changes from mainly circular to mainly striplike. The domain then preferably remains inside the heated area, i.e., the heated bit location. Domains in other bit locations, which themselves can also be heated, exert no additional effect on what happens inside the other bit location. Consequently, the bit locations can be situated comparatively close to each other, be it that the heated locations are not allowed to overlap each other. This risk is additionally small due to the fact that the amount of heat which is required per bit location for a displacement of a domain within this bit location, can locally be less intensive than in the known case. If the same quantity of heat were required, this quantity is distributed according to the invention over an area which is at least twice as large (first and second position). Moreover, the magnetic store according to the invention comprises a magnetic field source which ensures that, during the cooling of the heated bit location, the domain whose section is becoming circular again, is situated in the correct position (the second position). The field of said field source will be active in the plane of the plate, however, at an intensity which is only required for the above-mentioned situating. An excessively strong field could cause displacement of domains of non-heated locations.

Finally, it must be noted, that it is also known (from the above-mentioned literature) to heat material to the vicinity of its Curie temperature, in which case, a domain which is situated in such a heated location is pushed therefrom and searches for another stable position. As the temperatures which then occur are substantially higher than in the present case of utilizing the compensation temperature, which can be about room temperature, this is not a very useful concept. Moreover, a sharp definition of the target area of the beam on the plate is again required, so as to ensure that a domain is pushed away within given limits. This is because the storage capacity is related thereto.

It is necessary that the first and the second domain position of each bit location are more or less stable. This can be achieved in various manners. In the former known case, this is effected by means of a second plate which is made of a non-magnetic material, and in which openings containing a magnetized material are provided. The projections of these filled apertures on the plate of magnetic material produce a first and a second stable position at the area of the bit locations. In practice, this is a complicated solution, because such a second plate is difficult to manufacture and, moreover, it will have a substantial limiting effect on the storage capacity from a structural point of view (compare the conductor groups on the plate of magnetic material in the known device).

So as to eliminate this drawback, a further embodiment of the magnetic store according to the invention, at least one element of a material which can be readily magnetized by said magnetic field source is provided for each bit location at the area of the bit location in order to define a first and second domain position. This material can be, for example, permalloy. It is possible to provide for each bit location, for example, one permalloy strip or to provide one permalloy dot for each position (two) of each bit location. This is much simpler from a structural point of view, than the use of a second plate.

However, in view of a previously filed application (Netherlands Pat. No. 7,110,674), another solution is yet possible. In connection herewith a further embodiment of the store according to the invention provides an additional plate magnetic material so as to define a first and a second domain position in said plate for one domain for each bit location. The additional plate of a magnetic material comprises a domain for each first and each second domain position in the said plate of magnetic material. Interaction between the domains in the additional plate and domains of said plate causes the latter domains to be situated in one of the two positions of each bit location thus created.

Such a store according to the invention can be read out using known means. For reading out the store according to the invention, these means preferably utilize optical techniques: notably the Kerr or Faraday effect. In one case (Kerr effect) the rotation of the plane of polarization of light which is reflected by the plate is considered, while in the other case (Faraday effect) the plane of polarization of light transmitted through the plate is considered.

So as to ensure proper cooperation, a further embodiment of the store according to the invention is characterized in that said detection means for detecting the presence of a domain in one of the two positions comprises (A) a light source, the beam of which can be positioned on at least one bit location. The plane of polarization of the light which is transmitted through the magnetic plate or is reflected thereby, is rotated if it encounters a domain in the plate; (B) a mask which covers, at least in projection, either all first or all second positions of the bit locations; and (C) at least one light detector by means of which the rotation of the plane of polarization of the light passing the mask can be detected. Using this optical read-out method, the store can also be used as a visual display means; to this end, the store according to the invention is characterized in that for each bit location, a light detector is provided by means of which the information contents of the plate of magnetic material can be made visible.

In this respect, there is also a practical embodiment which is characterized in that said light source is the radiation source transmitting the said thermal-energy carrying beam. The quantity of heat which is applied to each bit location for detection of the positions of the domains in the plate of magnetic material is smaller than the quantity of heat which is applied to each bit location in the case of a displacement of a domain from a first to a second position of the bit location, or vice versa.

So as to enable practical use of the store according to the invention, in which words consisting of a (large) number of bits can be written/stored and read out again, a further embodiment of the store is characterized in that a number of said plates of magnetic material are used. In each of the plates of said number of plates, at least one bit location at a time is accessible to a beam from the radiation source as a result of the said deflection and addressing system and the use of beam-distribution means, so that a said number of domains can be displaced as well as determining their presence in the first or second position of their relevant bit locations.

Figure 2:
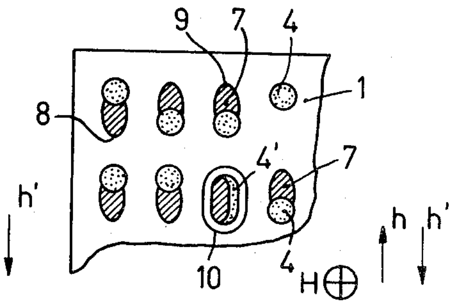
Figure 3:
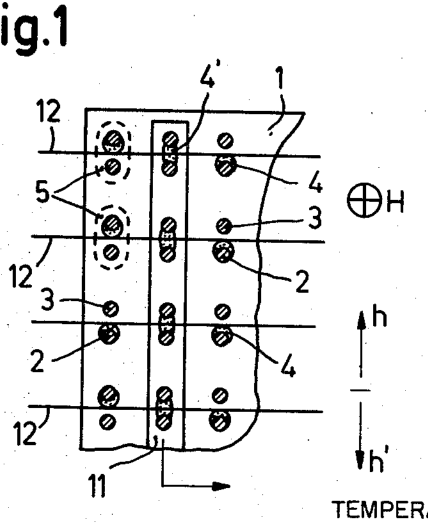
Figure 4:
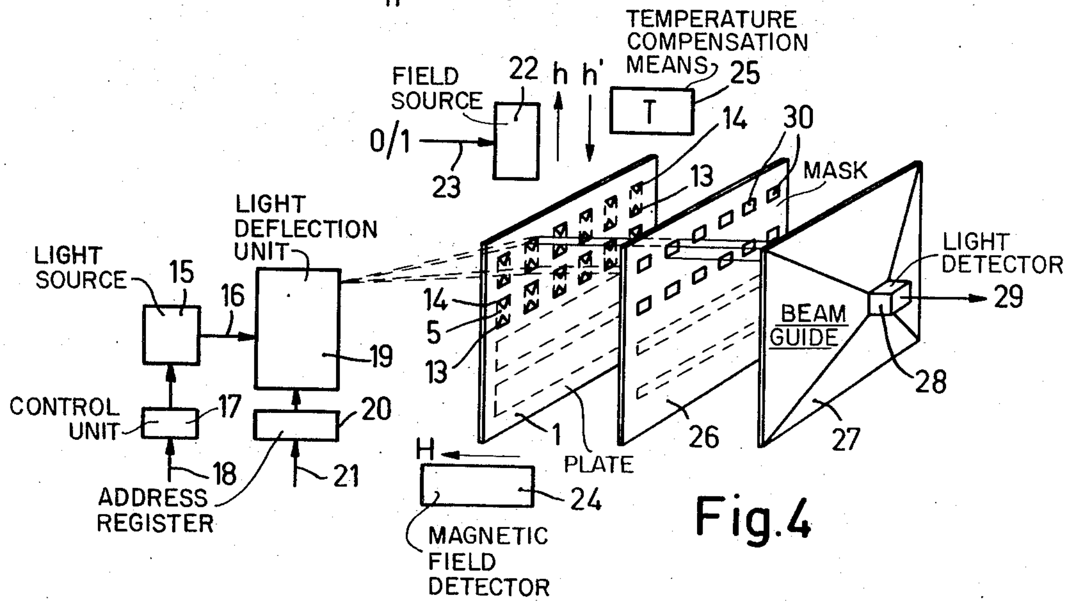
Figure 5:
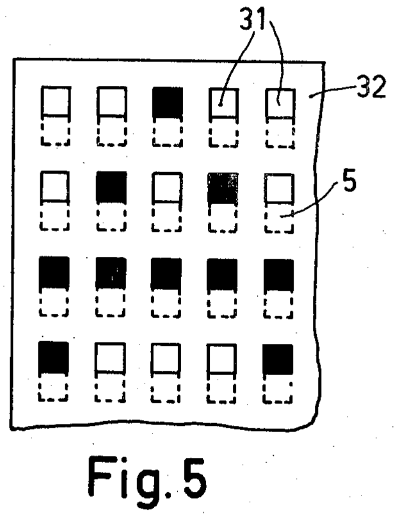
Figure 6:
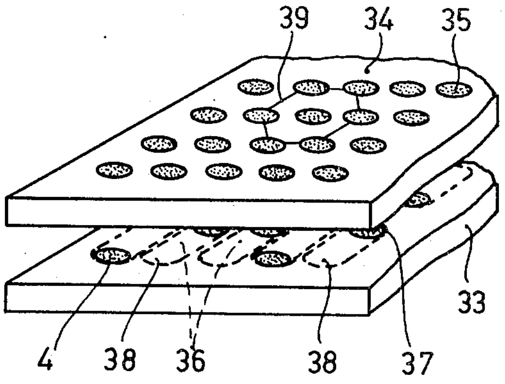
Figures 7, 8:
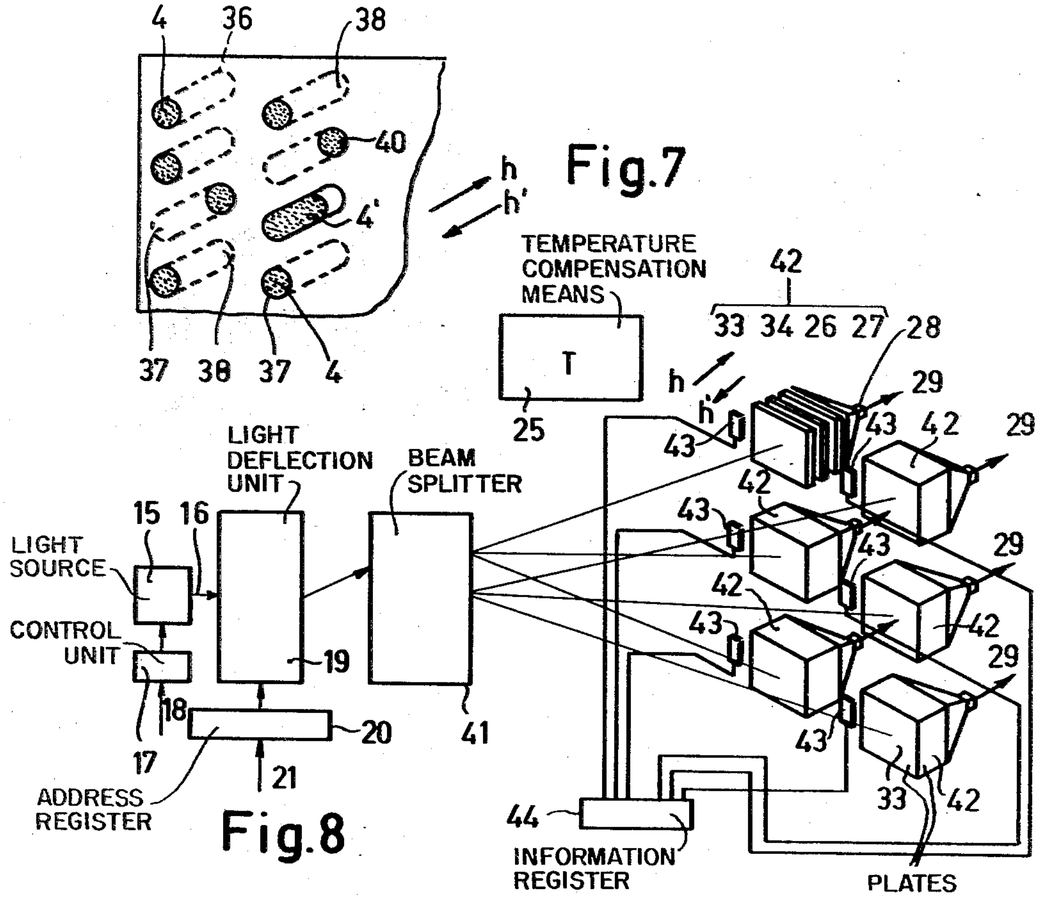

The invention will be described in detail hereinafter with reference to the drawings. In the drawings:

FIGS. 1, 2 and 3 show examples of plates of magnetic material for use in a magnetic store according to the invention, FIG. 4 shows a magnetic store according to the invention, FIG. 5 shows an example of a display image as output information of a magnetic store according to the invention, FIG. 6 shows an assembly of a plate of magnetic material and an additional plate of magnetic material for a store according to the invention, FIG. 7 is a plan view of the plate of magnetic material shown in FIG. 6, and FIG. 8 is a further example of a magnetic store according to the invention.

The reference numeral 1 in FIG. 1 denotes a plate of magnetic material which has a compensation temperature for the magnetization $M_s$. This means that the magnetization $M_s$ has the value $M_s = 0$ at a given temperature, which temperature can be room temperature. When the temperature increases above this compensation point, the magnetization $M_s$ increases.

Provided on the plate 1 are elements 2 and 3 which are shown in the form of dots, but these elements can also have another shape, for example, that of a triangle. These elements are made of a readily magnetizable material such as permalloy. At a given basic magnetic field H, assumed to extend from the front to the rear in FIG. 1, domains can exist in the plate 1. The magnetization of plate 1 opposes that of the external field H at the area of these domains. Each element pair 2 and 3 forms a bit location 5 on plate 1. A domain 4 can be present in such a bit location 5 in one of two positions 2 or 3, respectively. It can be assumed, for example, that a domain 4 in the first position 2 of a bit location 5, signifies that this bit location 5 has an information content 0, while a domain 4 in the second position 3 of a bit location 5 signifies that this bit location 5 has an information content 1. By means of a thermal-emergy carrying beam it is possible according to the invention, to heat a bit location 5 in a temperature range above said compensation point. For example, a beam is incident on the plate 1 at location 6. If the compensation point lies, for example, at −14° C, the said heating can be effected, for example, at about 20° C so that the temperature at the heated location is increased by a few degrees. As a result the relevant domain 4, present, for example, in position 2, and having a mainly circular section, changes over into a domain 4′ having a mainly strip-like section. The domain then extends as far as the second position 3. Consequently, the domain extends between positions 2 and 3. When the thermal beam disappears, the location 6 cools and the strip-like section of the domain 4′ changes into a mainly circular section again. If a magnetic field h is present in the indicated direction (from the bottom upwards in FIG. 1) during this cooling, and hence during the said changing of the shape of the domain 4′, the domain 4, now circular again, will be situated in the second position 3 of the bit location 5. As a result of the displacement of the domain 4, the information content of such a bit location 5 has now been changed from 0 to 1. A displacement in the other direction, from position 3 to position 2, can be achieved in the same manner, but using a field *h* in the other direction. By displacing the thermal-energy carrying beam continuously from bit location to bit location, i.e., by positioning each time on another bit location, the plate 1 can be filled with information contents equal to the number of bit locations 5. The magnetic field *h* need be only very weak, i.e., just sufficient to contract the geometrically changing domain 4 in the desired direction so that it will be situated in the desired position. It is obvious that one domain 4 must be present in each bit location 5, before the storage of information can be effected for the first time. The situation where there is one domain in each bit location can be achieved in various manners using means for generating domains in a plate of magnetic material. For example, use can be made of a domain source in the form of a wire loop through which a pulse current is fed. For example, initially domains can be generated which have the dimensions of one bit location, each bit location being provided with such a domain (the complete filling of a plate of magnetic material with domains). The domains can be given the correct dimensions by a given adjustment of the basic field. They can then be situated, for example, at random in the one (2) or the other position (3) of a bit location 5, because this does not impose any problems.

The following will make it clear that for the writing of information, both for the first time and on already present information, it is of no importance in which of the two positions of each bit location a domain is present: during the heating, the section of the domain 4 becomes strip-like and will travel to a new position (from 2 to 3 or from 3 to 2) under the influence of the magnetic field *h* or *h*′, or it will remain in its old position (2 or 3).

FIG. 2 shows that for defining a first and a second stable domain position on plate 1, instead of dot-like elements 2 and 3, a strip-like element 7 can alternatively be used, the latter element also marking the bit location. This element 7 of a readily magnetizable material (permalloy) is comparable to a strip as used for the displacement of domains along a permalloy T-bar structure. The element can be magnetized in the one or in the other direction, again by means of a magnetic field *h* or *h*′, so that a domain 4 will be situated on the one end 8, or on the other end 9. These ends 8 and 9, thus constitute the first and the second domain positions, respectively, of the bit locations 7. If a bit location 7 on plate 1 is heated in the target area 10 by a thermal-energy carrying beam, a domain 4 which was initially situated in the lower (first) position 8, is enlarged to a domain 4′ having a strip-like section. When this area 10 cools, the section of domain 4′ becomes circular again. The magnetic field *h* ensures that the domain being formed will be situated in the upper (second) position 9. The field *h* is only as large as is required for moving such a domain, the domain from a strip-like section to a circular section, to the desired position. The field *h* is too weak to displace a domain 4 simply from a first position 8 to a second position 9.

FIG. 3 shows another set-up of a plate 1 of magnetic material which can be used in the store according to the invention.

Also in this case, each bit location 5 comprises, by way of example, two elements (dots) 2 and 3 of permalloy which define the first and the second domain positions, respectively, of each bit location. The difference with respect to FIG. 1, is the target area 11 of a thermal-energy carrying beam on plate 1. THe target area 11 comprises a series of bit locations 5. The beam can be displaced from left to right (arrow) in FIG. 2, so that the beam is incident each time on another series of bit locations 5. The bit locations 5 within the target area 11 are thus heated and the section of the domains in this area becomes strip-like (4′). So as to enable storage of the information contents (0 or 1) in each bit location upon cooling, use is made of conductors 12 enabling the introduction of a magnetic field *h* for each bit location at the correct instant, the said field ensuring that the domains 4 will be situated in the first (2) or the second position (3). One conductor 12 is thus provided for each row of bit locations, a magnetic field h or h' being produced in the one or the other direction about said conductor 12 when a current pulse is passed through the said conductor 12 in the one or the other direction. Providing such a conductor 12 for each bit location is somewhat more difficult to realize from a structural point of view, but it is advantageous since parallel-operation of the store according to the invention is then possible (that is to say, it can handle a plurality of bits simultaneously).

FIG. 4 is a more detailed view of a store. This figure also shows detection means. A plate 1 of magnetic material comprises bit locations 5. The first and the second domain positions are defined, by way of example, by permalloy triangles 13 and 14, respectively. The reference numeral 15 denotes a light source which transmits a thermal-energy carrying light beam 16. The intensity of the beam can be adjusted and is controlled by a control unit 17 which receives a signal via input 18. If new information is written in plate 1, the beam 16 contains a quantity of energy which is larger than when the information is read out (the latter is effected in a non-destructive manner). For the write operation, the control unit 17 is set, via 18, to a position in which the light source supplies the desired write energy, while in the case of a read operation the unit 17 is set, via input 18, to a position such that the light source supplies the desired read energy. The reference numeral 19 denotes a light-deflection unit. By means of this unit, the light beam 16 can be directed onto any desired bit location 5 of plate 1. The desired bit location is a so-termed address in plate 1. The desired address is preferably applied in digital form to an address register 20 via an input 21 (parallel or series). If 19 is a digital light-deflection unit, the digital address in register 20 serves directly as an adjusting value for the deflection unit 19. If 19 is an analog deflection unit, the address can first be converted in a converter (not shown). When the light-deflection unit has been adjusted to the correct address, a write or read command can be given via input 18. In the case of a write operation, the relevant bit location is radiated so long, or so intensively, that a strip-like domain is produced at the area thereof. During cooling (the light beam is extinguished or is deflected to a subsequent bit location) of the relevant bit location, it must be ensured that the correct information (0 or 1) is written. If a 1 is represented by a domain in the second position (14), it is necessary for the writing of a 1, that during the cooling, the field source 22 supplies a field h which extends in the upward direction in FIG. 4. To this end, the field source 22 comprises an input 23 to which the information to be written is applied. In the case of information bit = 1, the said field h is generated, while in the case of information bit = 0, the opposite field h' is generated.

FIG. 4 also shows a basic magnetic field generator 24 which generates the basic field H. The reference numeral 25 denotes means which ensure that the plate 1 is kept at a substantially constant temperature T, which is higher than the compensation temperature, for example, 20° C. Detection means 26, 27, 28 are provided for reading out. In this case use is made of the rotation of the plane of polarization of the light transmitted through the plate 1, which occurs if this light encounters a domain. A mask 26 which comprising openings 30 is used to cover approximately half the area of each bit location, so that only light which is transmitted through the (in this case) second positions 14 appears behind the mask 26. A light beam guide 27 ensures that the transmitted light impinges upon a light detector 28. This detector reacts, for example, only to the incident light whose plane of polarization has a given position. For example, light having a polarization plane which is rotated with respect to the original position, causes a signal in this detector 28. This signal is the output signal on output 29. In the case of a read operation, the light source 15 supplies a light beam 16 containing the desired read energy and this light beam 16 is directed in the deflection unit 19, under the control of the address in register 20, onto the correct address (= bit location) of plate 1. The plane of polarization of the part of the light which does not encounter a domain remains unchanged. The plane of polarization of the part of the light which encounters a domain is rotated. Half the area of each bit location 5 is covered by the mask 26 having openings 30, so the information concerning the presence or absence of a domain in only one of the two domain positions 13 and 14, respectively, is allowed to pass. In this example, it is always considered whether or not a domain is present in the second position (14). If output 29 supplies a signal, a domain was present (information bit = 1). If input 29 does not supply a signal, no domain was present in this position of the addressed bit location (information bit = 0). The described read operation is non-destructive, because the information is not lost. Reading-out can in principle be rendered destructive (by using light having a larger energy content, so that the bit location is heated again and a field, for example h', ensures that all first positions 13 are occupied again after reading); however, in that case, the detector 28 may be scanned only very briefly to determine the information contents of the addressed location. The described storage device can of course also comprise a plate 1 as shown in FIG. 3, so that writing and reading can be performed for a number of bit locations simultaneously. In that case, the detection means must comprise instead of one light detector, as many light detectors as there are simultaneously "radiated" bit locations.

FIG. 5 shows that it can also be useful to display the information contents of a plate 1. In that case, not one light detector is provided behind the mask 26 (FIG. 4), but as many light detectors 31 on a panel 32 as there are bit locations 5 (shown once more in broken lines on panel 32) on plate 1. The information content of each bit location is thus displaced. If there was a bit = 1 (position 14 in FIG. 4), it is visible in a detector 31 of a panel 32. In this manner, a complete image can be composed. FIG. 5 shows a letter A. The black dots can thus originate from domains which are situated in positions 14 of plate 1 (FIG. 4).

FIG. 6 shows an assembly of a plate of magnetic material 33, containing domains 4, and an additional plate of magnetic material 34 containing domains 35. Plate 33 is identical to the already described plate 1, be it that plate 33 does not have dots/strips etc. of a readily magnetizable material. The bit locations 36 (encircled by a broken line) again have a first position 37 and a second position 38 for a domain 4. Both these positions 37 and 38 are defined for each bit location by corresponding domains 35 in the additional plate 34. This plate 34, thus forms the stable positions by means of its domains 35, i.e. two for each bit location 36 of plate 33. This is based on the interaction which occurs between two domains which are situated one above the other in plates of a suitable thickness (for details see the previously filed Netherlands Pat. application No. 7,110,674). If an appropriate choice is made, such a configuration does not require a basic field H for continued existence of the domains. The plate 34 is completely filled with domains in this case, according to a hexagonal grid pattern (see encircled part 39). FIG. 7 shows what such a filling means to the bit-location organization in the plate 33, when this plate is subjected to the influence of the domains 35 of plate 34. The bit locations 36 (denoted by a broken line) are thus situated according to a direction of the hexagonal grid. Consequently, heating must be possible in the target area of each of the bit locations 36 shown. The remainder of the operation is the same as described with reference to FIG. 1. When area 40 is heated, a domain 4 becomes strip-like (4'), and upon cooling it is brought in to the correct position (in this case 38) of the two possible positions (37 and 38) by the applied field *h*. The reverse effect can be achieved in the same manner as by means of a field *h'*.

FIG. 8 shows another example of a store according to the invention. Use is made, by way of example, of the assembly of plates 33 and 34 according to FIG. 6. This store has an extra large storage capacity. In the example according to FIG. 4 one information bit was dealt with at a time, but in this case, *n* information bits are dealt with simultaneously. In the drawing $n = 6$, but in practice it can be much larger. This is made possible by using a beam splitter 41 which is connected behind the light deflection unit 19 (corresponding components are denoted by the same references). This beam splitter 41 splits a light beam 16, into *n* (=6) individual beams. The beam has been already assigned a direction in the unit 19, which corresponds to an addressed location of a plate 33. Each of the six sub-beams is incident on an individual plate 33. With the address in register 20, a complete word of $n = 6$ bits is then selected. Each plate 33 is thus exposed to its light beam at the same bit location. Arranged behind each plate 33 is an additional plate 34, a mask 26, a light guide 27, and a light detector 28 (shown only once, but further combined by the reference 42). Each combination 42 has a signal output 29. Each combination 42 furthermore comprises a field source 43 which can supply a field *h* or *h'* in the plane of plate 33. Also provided is an information register 44. The operation is fully analogous to that of the store described with reference to FIG. 4, be it that the stable first and second positions are now produced for each bit location by the plate shown in FIG. 6, which is completely filled with domains. For writing, it is determined for each plate 33, i.e. for each bit of a word to be written, which direction of the magnetic field *h* (*h'*) is required, so as to make the domains assume their correct position. So as to achieve this object, a word to be written is placed in the information register 44. This register controls the field sources 43 such that they supply a field *h* in 44 in the case of a 1-bit, and field *h'* in 44 in the case of a 0-bit. In this manner, a complete word can be written in one operation. During reading, a complete word at a time is again selected under the control of the light deflection unit 19, in combination with the beam splitter 41. The light now serves for detection of the presence or absence of the domains in, for example, the relevant second positions of the relevant bit locations of the plates 33. Consequently, this detection either produces or does not produce a signal on the outputs 29. The combined outputs 29 supply the read word. It is to be noted that, if use is made of plates 34, which are completely filled with domains, the heating during the writing of information should not change the shape of these domains in such a plate 34, as otherwise the definition of the stable positions will be lost. This can be readily prevented by using a magnetic material for the plates 34 which has no, or a comparatively high, compensation temperature.

It is also to be noted that, when use is made of said plates 34, a domain is always present in the light path from plate 33 to the detector 28 during reading, because plate 34 is completely filled with domains 35. The detection of the presence or absence of a domain in the second domain positions in plates 33 is still possible, because the rotation of the plane of polarization always occurring as a result of domains 35 in plate 34, will be larger or smaller as a result of the presence or absence, respectively, of a domain in said second position of the bit location on plate 33. It is obvious that light detectors 28 must be chosen which are capable of distinguishing these differences in rotation of the plane of polarization.

What is claimed is:

1. A magnetic store comprising a plate of magnetic material on which functionally determined bit locations are provided, each bit location having two positions for each said bit location, and one domain which has a mainly circular section, said magnetic store comprising transport means for controlled displacement of the domain from one of said two positions to the other of said two positions in a chosen bit location, and detection means for detecting the presence of a domain in one of the two positions of a bit location, said plate of magnetic material furthermore having a compensation temperature for magnetization and surrounded by means for keeping the plate at a substantially constant temperature, a radiation source and a beam deflection and addressing system also being provided, said radiation source supplying a thermal-energy carrying beam which is positioned on at least one bit location at a time, and by means of which a quantity of heat is applied to the bit location in a temperature range above the compensation temperature, said heat causing the domain to change from a mainly circular section to a mainly strip-like section, there further being provided a magnetic field source supplying a magnetic field for situating a domain during the cooling in one of said two positions of the bit location thus heated, the relevant domain then changing over again from a mainly strip-like section to a mainly circular section.

2. The magnetic store as claimed in claim 1, wherein for defining two positions for a domain, there is provided for each bit location, at the area of the bit location, at least one element of a material which can be readily magnetized by said magnetic field source.

3. The magnetic store as claimed in claim 1 wherein a plurality of said plates of magnetic material are used, at least one bit location at a time being accessible to a beam from the radiation source as a result of said deflection and addressing system and the use of the beam distribution means, so that a said number of domains can be displaced as well as determining their presence in either of the two positions of their relevant bit locations.

4. The magnetic store of claim 1, wherein an additional plate of magnetic material is provided for defining a first and a second domain position for one domain in each bit location, said additional plate comprising a domain for each of the first and second domain positions in said plate of magnetic material, interaction between domains in the additional plate and domains of said plate of magnetic material ensuring that the latter plate domains are situated in one of the two positions of each bit location thus created.

5. The magnetic store as claimed in claim 1, wherein said detection means for detecting the presence of a domain in one of the two positions comprises: a light source, the beam of which can be positioned on at least one bit location at a time, the plane of polarization of the light transmitted through the plate or reflected thereby being rotated if it encounters a domain in the plate; a mask which covers, at least in protection, all of either one of the two positions of the bit locations; and at least one light detector by means of which a rotation of the plane of polarization of the light which has passed said mask can be detected.

6. The magnetic store as claimed in claim 5, wherein for each bit location a light detector is provided by means of which, the information contents of the plate of magnetic material can be made visible.

7. The magnetic store as claimed in claim 5 wherein said light source is a radiation source for transmitting said thermal-energy carrying beam, the quantity of heat which is applied per bit location, for detection of the positions of the domains in the plate of magnetic material, being smaller than the quantity of heat which is applied per bit location, when a domain is moved from one of said two positions to the other of said two positions.

* * * * *